Dec. 29, 1964 R. C. CORBELL ETAL 3,163,777

DRIVER CIRCUIT EMPLOYING CHARGED TUNED LOAD FOR CONVERTING VOLTAGE LEVEL CHANGES TO CURRENT PULSES

Filed Aug. 25, 1961

INVENTORS
ROBERT N. MELLOTT
RAYMOND C. CORBELL
BY
Arthur Freilich
ATTORNEY 3,163,777
Patented Dec. 29, 1964

3,163,777

DRIVER CIRCUIT EMPLOYING CHARGED TUNED LOAD FOR CONVERTING VOLTAGE LEVEL CHANGES TO CURRENT PULSES

Raymond C. Corbell, Canoga Park, and Robert N. Mellott, Northridge, Calif., assignors, by mesne assignments, to The Bunker-Ramo Corporation, Stamford, Conn., a corporation of Delaware Filed Aug. 25, 1961, Ser. No. 133,844
9 Claims. (Cl. 307—88.5)

This invention pertains to a circuit capable of converting voltage level changes into current pulses particularly suitable for driving reactive loads such as magnetic devices.

In applicants' copending application "Logical Level Sense Amplifier," U.S. Serial No. 86,163, filed January 31, 1961, it is pointed out that information can be represented in many different forms in electronic computers; for example, at one stage of handling, binary information can be represented by two different D.-C. voltage levels corresponding respectively to binary "one" and binary "zero" and at another stage by A.-C. current pulses of opposite polarity. It is often necessary to be able to convert rapidly from one form of information to another, as for instance, when magnetic devices, such as transfluxors are employed. The transfluxor is a magnetic device which may be utilized for switching purposes; that is, to selectively control communication between a pair of circuits. The transfluxor is essentially an A.-C. device and only current changes can be coupled through it. Therefore, in order to transfer D.-C. voltage level information between a pair of circuits, via transfluxors, it is necessary to initially convert the voltage levels to pulses and secondly to convert the pulses back to voltage levels.

In applicants' above identified copending application, a circuit for converting pulses to voltage levels is described. It is a general object of the invention herein to provide a circuit capable of performing the reverse function; namely, that of converting changes in voltage levels to current pulses.

It is an additional object of this invention to provide a circuit for converting voltage level changes into pulses suitable for driving reactive loads such as magnetic devices which are highly inductive.

It is still an additional object of this invention to provide an optimum circuit arrangement utilizing a minimum number of elements, all of which comprises conventional computer equipment, for supplying uniform output pulses suitable for driving magnetic devices in response to changes in input voltage level.

Briefly, the invention recognizes that by utilizing a difference amplifier, voltage level input changes can be employed to initiate transistor current in an output circuit and that by minimizing the transistor power dissipation, by employing a tuned load and clipping negative current swings such that the transistor can be cut off when no current exists therein, the output current can be maximized so that it is suitable for driving, e.g., a plurality of magnetic devices.

The preferred embodiment of the invention, described in detail below, includes a single input and a pair of outputs and functions such that a change in input from a first to a second voltage level causes a pulse on one output and a change back to the first level causes a pulse on the second output. A single input difference amplifier, including a pair of transistors, is utilized, and is operable such that for one level of input voltage a first of the transistors is conducting and the second is cut off and for another level of input voltage, a second of the transistors is conducting and the first is cut off. An inductor is connected in the emitter-collector circuit of each difference amplifier transistor. Each inductor is connected to a pulse shaping circuit through the base of an input transistor. When a difference amplifier transistor is cut off by a change in input level, the inductor connected to it is discharged through the base-emitter path of the normally off biased input transistor thereby driving it near saturation. This causes the pulse shaping circuit output transistor to be driven on. Since the output transistor is loaded by a tuned circuit, including the magnetic device to be driven, damped oscillations are initiated therein. Accordingly, a positive half sinusoid is driven through the load device. A diode connected in series in the tuned circuit prevents negative current from flowing. If the inductor values are properly chosen, the pulse shaping circuit transistors are cut off before a second positive sinusoid is initiated. Driving the load in this manner provides much higher drive current than would normally be expected. Generally, drive current magnitudes are limited by the permissible transistor power dissipation which is equal to the product of the emitter-collector voltage drop and current. Conventional techniques suggest directly turning the transistor on and off, as by using base current to bias the transistor. When this is done however, maximum power dissipation occurs during cut off; i.e., when the emitter-collector voltage drop is increasing and the emitter-collector current is decreasing. By utilizing the approach suggested herein, this region of maximum power dissipation is avoided because the transistor is cut off, i.e., the emitter-collector voltage drop increase occurs, when no emitter-collector current exists.

Other objects and advantages, which will subsequently become apparent, reside in the details of circuitry and operation as more fully hereinafter described and claimed, further reference being made to the accompanying drawings forming a part hereof, wherein like identifying numerals refer to like parts throughout the several figures, and in which:

Figure 2:
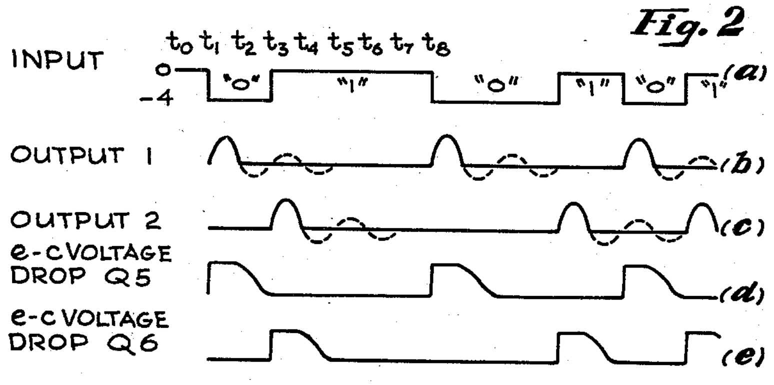
FIGURE 2 is a diagram of various signals plotted with respect to time at different points in the circuit of FIGURE 1.

With continuing reference to the drawings, attention is initially called to FIGURE 2. Illustrated in FIGURE 2(*a*) is a typical pattern of binary information presented in the form of D.-C. voltage levels; i.e., it will be noted that a voltage of −4 volts is utilized to represent binary "0" while a voltage at ground is utilized to represent binary "1." As previously pointed out, if such information is to be transferred through magnetic devices, such as transfluxors, it is necessary that the voltage level changes be converted to current pulses. Accordingly, illustrated in solid lines in FIGURES 2(*b*) and 2(*c*) are desired pulse signals corresponding to the binary information in FIGURE 2(*a*). It will be noted that when the information changes from binary "1" to binary "0," a pulse is to be generated on output 1 while on the other hand when the information changes from binary "0" to bianry "1," a pulse is to be generated on output 2. Although two separate outputs are contemplated herein, the provision of pulses of different polarity on the same output is well suggested by the discussion that follows.

Figure 1:
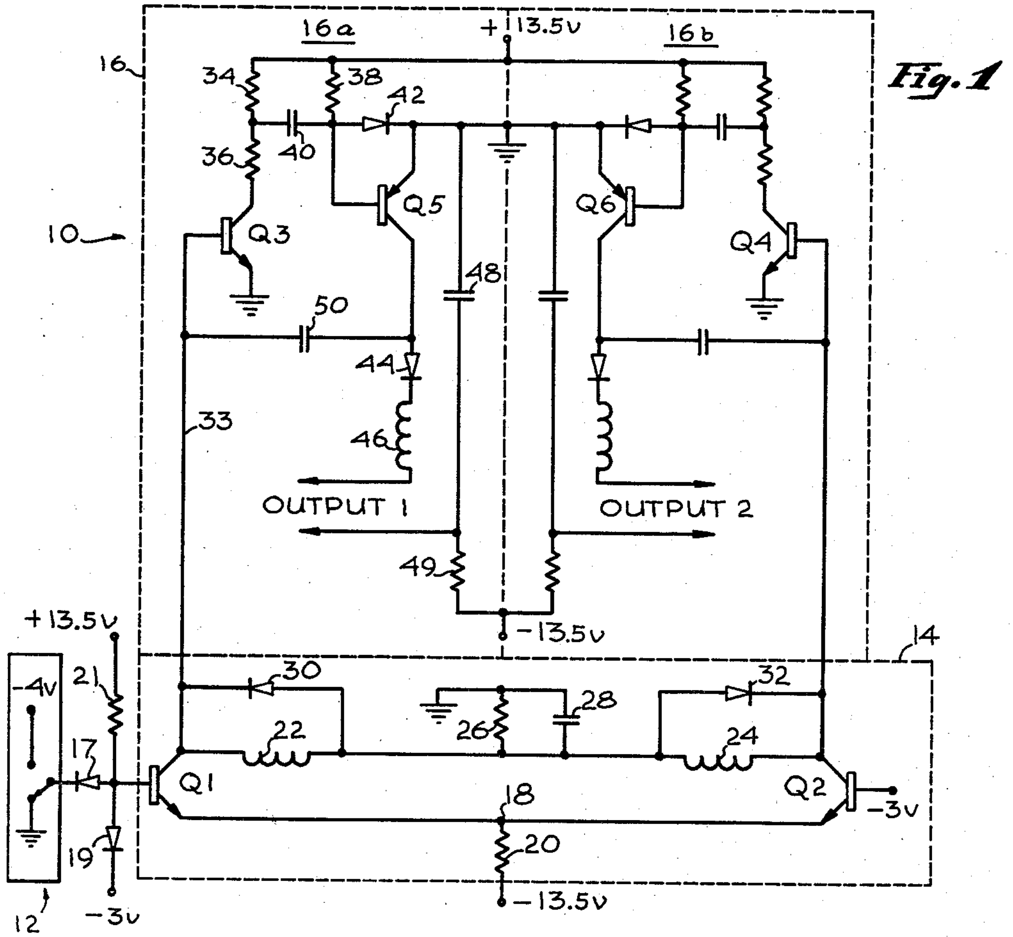
FIGURE 1 is a circuit diagram of the invention.

Attention is now called to FIGURE 1 wherein numeral 10 designates the invention introduced herein while numeral 12 designates a bistable circuit having a bilevel voltage output residing at either −4 volts or ground. It is well to point out that all quantitative values, transistor types, etc. introduced herein are for exemplary purposes only and the modification of the invention (as e.g., changing polarity where necessary) with respect to these matters is appreciated as being apparent to one skilled in the art. Bistable circuit 12 may comprise any conventional flip-flop and may well represent one bit in a computer register. The circuit 10 basically comprises two principal sections; namely, a difference amplifier 14 and a pulse shaping circuit 16 comprising two identical halves 16*a* and 16*b*.

The difference amplifier 14 includes a pair of transistors Q1 and Q2, each of the NPN type. The emitters of transistors Q1 and Q2 are each directly connected to junction point 18 which is connected through resistor 20 to a −13.5 volt source. The base of transistor Q1 is connected to the output of bistable circuit 12 through diode 17, to a −3 volt potential through diode 19 and to a +13.5 volt potential through resistor 21. The base of transistor Q2 is connected to a −3 volt potential. Connected to the collectors of Q1 and Q2 respectively are inductors 22 and 24 each connected to ground through a parallel network comprising resistor 26 and capacitor 28. Inductors 22 and 24 are respectively shunted by diodes 30 and 32.

When the output of bistable circuit 12 is at ground, the base of transistor Q1 is held above −3 volts and accordingly above the base of transistor Q2 by the drop across diode 19. Transistor Q1 is therefore "on" biased permitting current to flow from ground through the parallel combination comprising resistor 26 and capacitor 28, through the parallel combination comprising diode 30 and inductor 22, through the collector-emitter circuit of transistor Q1 and thence through resistor 20 to the −13.5 volt source. The voltage drop across resistor 20 raises the potential at junction point 18 and "off" biases transistor Q2. When the output of bistable circuit 12 changes from ground to −4 volts, the base of transistor Q1 drops below −3 volts and accordingly below the base of transistor Q2 by the drop across diode 17. Transistor Q1 is therefore cut off thereby lowering the potential of junction point 18 to permit the −3 volt source connected to the base of transistor Q2 to "on" bias transistor Q2 such that current flows from ground through the parallel combination comprising resistor 26 and capacitor 28, through the parallel combination comprising diode 32 and inductor 24, through the collector-emitter circuit of transistor Q2, through resistor 20 to the −13.5 volt source. The potential of junction point 18 is raised by the drop across resistor 20 and transistor Q1 accordingly becomes further "off" biased. It is therefore appreciated that when the output of bistable circuit 12 is at ground, i.e. above the −3 volt potential transistor Q1 conducts and when the output is at −4 volts, transistor Q2 conducts. The −3 volt potential can therefore appropriately be considered a threshold voltage level. The parallel combination including the resistor 26 and capacitor 28 connected between ground and the inductors 22 and 24 serves to substantially establish a fixed potential at the common junction of the inductors 22, 24; that is, inasmuch as one of the transistors Q1 or Q2 is always conducting, a voltage is established across the capacitor 28 equal to the average voltage drop across the resistor 26. The capacitor maintains the common junction between the inductors at a fixed voltage level during the transistion period when conduction shifts from one transistor to another. Diodes 30 and 32 serve both to prevent the inductors 22 and 24 from delaying current flow through the transistors Q1 and Q2 when the transistors initially become "on" biased and to dampen any ringing tending to be caused by the inductors.

Inasmuch as the halves 16*a* and 16*b* of pulse shaping circuit 16 are identical in circuitry and operation, a detailed explanation only of half 16*a* will be set forth. The pulse shaping circuit half 16*a* includes an NPN input transistor Q3 and a PNP output transistor Q5. The base of transistor Q3 is connected via conductor 33 to inductor

22. The collector of transistor Q3 is connected to a +13.5 volt source through resistors 34 and 36 while the emitter is grounded. The base of transistor Q5 is connected to the +13.5 volt source through resistor 38. Capacitor 40 connects the base of transistor Q5 to the junction between resistors 34 and 36. Diode 42 is connected between the base and the grounded emitter of transistor Q5. The collector of transistor Q5 is connected through a clipping diode 44 and an inductance 46 to the load to be driven (e.g., a magnetic device such as a transfluxor) and thence through a capacitor 48 to ground. A resistor 49 is connected between capacitor 48 and a 13.5 volt potential. A capacitor 50 couples the collector of transistor Q5 to the base of transistor Q3.

Attention is now called to FIGURE 2(*a*) wherein a typical input information pattern from bistable circuit 12 is illustrated. As indicated, the output of bistable circuit 12 is initially at ground potential. As previously pointed out, this will cause transistor Q1 to conduct and "off" bias transistor Q2. When at time $t_1$, the output of circuit 12 drops to −4 volts, transistor Q1 becomes "off" biased and transistor Q2 becomes "on" biased. Inasmuch as the current through inductor 22 cannot be cut off immediately, it is discharged through conductor 33 into the base of transistor Q3. Transistor Q3, which is normally "off" biased by the positive potential on its collector is thereby biased "on" causing the voltage at the junction between resistors 34 and 36 to suddenly drop. The sudden voltage drop is coupled through capacitor 40 to the base of transistor Q5 causing the base to fall below ground potential. Accordingly, transistor Q5, which is normally "off" biased due to the positive potential on the base from resistor 38 and the voltage drop across diode 42 which maintains the base potential above the emitter potential, becomes "on" biased causing its emitter-collector voltage drop to fall to near zero volts, FIGURE 2(*d*). Conduction in transistor Q5 permits capacitor 48 (which was charged through resistor 49) to discharge initiating damped oscillations in the tuned load connected in the emitter-collector circuit of transistor Q5 and causes capacitor 50, connected between the collector of transistor Q5 and the base of transistor Q3, to couple back additional base drive to transistor Q3. It should be appreciated that inductor 46 and capacitor 48 are chosen to be of such a value that, together with the magnetic devices to be driven, a resonant condition is set up such that the damped oscillations will be initiated. Referring to FIGURE 2(*b*), it will be noted that a positive half sinusoid appears at the output 1 terminal in response to the input to transistor Q1 dropping from 0 to −4 volts. The negative swing is shown in FIGURE 2(*b*) in dotted lines inasmuch as this occurrence is prevented by the inclusion of diode 44 in the tuned circuit. If the inductor 22 is chosen appropriately, transistor Q3, and accordingly transistor Q5 will be cut off before the second positive half sinusoid is initiated; that is, the discharge time constant determined by the inductor 22 and discharge circuit including conductor 33 and transistor Q3 should be of a sufficient duration such that transistors Q3 and Q5 do not begin to cut off until (time $t_2$) the termination of the first positive half sinusoid in the tuned load but are fully cut off prior to the initiation (time $t_3$) of the second positive half sinusoid therein. As will be more particularly described below, inasmuch as cut off of transistor Q3 occurs during an interval when no current is flowing through the transistor Q5, the normal power dissipation peak in the transistor generally experienced upon cut off will be avoided. From FIGURE 2, it should be noted that just as the cutting off of transistor Q1 initiated a positive half sinusoidal pulse through the load connected to output 1, cutting off of transistor Q2 initiates the identical sequence in pulse shaping circuit half 16*b* resulting in a half sinusoidal output on output 2.

Figure 3:
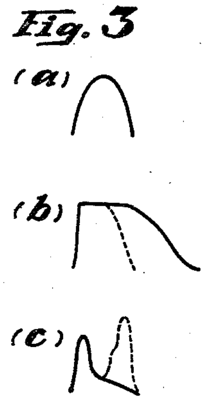
FIGURE 3 is an enlarged diagram of typical signals extracted from FIGURE 2 to particularly illustrate the advantages attendant to drving a load in accordance with the teachings herein as compared to conventional techniques.

Attention is now called to FIGURE 3 wherein FIGURE 3(*a*) illustrates the half sinusoidal current pulse output desired to drive the load device. FIGURE 3(*b*) illustrates, in solid lines, the emitter-collector voltage drop in either transistor Q5 or Q6 when a tuned load is utilized in accordance with the teachings of the invention. According to the conventional techniques in order to shape a current pulse similar to that in FIGURE 3(*a*), it would be necessary to start cutting off the output transistor at the current pulse peak such that the emitter-collector voltage drop follows the dotted line shown in FIGURE 3(*b*). FIGURE 3(*c*) illustrates the power dissipation curves for a transistor appropriate to the respective techniques. If the tuned load technique suggested herein is utilized, the power dissipation, which is the product of the emitter-collector voltage and current, is represented by the solid line. If the output transistor were cut off according to conventional techniques such that the emitter-collector voltage drop follows the dotted line in FIGURE 3(*b*), the transistor power dissipation curve would follow the dotted line in FIGURE 3(*c*) resulting in a peak power dissipation during cut off and accordingly limiting the magnitude of drive current available from the transistor. By avoiding the peak power dissipation, the invention herein is able to provide currents of high enough magnitude for driving core and transfluxor arrays.

From the foregoing therefore, it should be appreciated that applicants have provided herein a circuit for converting input voltage level changes into output current pulses. The circuit is capable of operating at an exceedingly high repetition rate and very little delay is experienced from trigger to output. The shape and duration of the output pulses are uniform and independent of the rate of change of input voltage and conduction time of the output transistors.

The foregoing is considered a preferred embodiment illustrative of the principles of the invention and it is to be understood that specific quantitative values, transistor types, polarities, etc. are exemplary in nature and that all modifications readily occurring to those skilled in the art fall within the scope of the invention as claimed.

The following is claimed as new:

1. A circuit arrangement capable of discriminating between voltage input levels above and below a threshold voltage level for generating a first output pulse when said input level changes from below to above said threshold level and a second output pulse distinguishable from said first output pulse when said input level changes from above to below said threshold level comprising: a difference amplifier including a pair of transistors each having a base, an emitter, and a collector; means connecting the base of a first of said transistors to said voltage input; means joining the emitters of said transistors thereby defining a junction; impedance means coupling said junction to a voltage source; means connecting the base of a second of said transistors to a voltage source equal to said threshold level such that when the voltage input biases said first transistor "on," the voltage drop across said impedance appearing at said junction biases said second transistor "off," and when the voltage input biases said first transistor "off," the voltage drop across said impedance appearing at said junction biases said second transistor "on"; first and second inductors connected, respectively, to the collectors of said first and second amplifier transistors; first and second pulse shaping circuits; discharge path means respectively connecting said first and second inductors to said first and second pulse shaping circuits for discharging the energy stored in each inductor when the amplifier transistor to which the inductor is connected is biased "off"; each of said pulse shaping circuits including input and output transistors; means biasing said input transistors "off" in the absence of applied discharge energy and "on" during the application of said discharge energy; means operatively coupling said input and output transistors such that each output transistor is biased "on" whenever the coupled input transistor is biased "on"; a tuned load connected to each of said output transistors whereby oscillations will be generated therein when said output transistors are biased "on"; said tuned load including a unidirectional element connected in series for permitting current in only one direction; said inductors being of such value that said discharge energy is applied to said input transistors during a first positive current swing in said load and terminated prior to the initiation of a second positive current swing in said load.

2. A circuit arrangement capable of discriminating between voltage input levels above and below a threshold voltage level for generating a first output pulse when said input level changes from below to above said threshold level and a second output pulse distinguishable from said first output pulse when said input level changes from above to below said threshold level comprising: a difference amplifier including a pair of transistors; means connecting a first of said transistors to said voltage input; means connecting a second of said transistors to a voltage source equal to said threshold level; means coupling said first and second transistors such that when said first transistor is biased "on" by said input being above said threshold level said second transistor is biased "off" and when said second transistor is biased "off" by said input being below said threshold level said first transistor is biased "on"; an inductor connected in series with each transistor; a pair of loads; and a discharge path respectively connecting each inductor to each load.

3. A circuit arrangement capable of discriminating between voltage input levels above and below a threshold voltage level for generating a first output pulse when said input level changes from below to above said threshold level and a second output pulse distinguishable from said first output pulse when said input level changes from above to below said threshold level comprising: a difference amplifier including a pair of transistors; means connecting a first of said transistors to said voltage input; means connecting a second of said transistors to a voltage source equal to said threshold level; means coupling said first and second transistors such that when said first transistor is biased "on" by said input being above said threshold level said second transistor is biased "off" and when said second transistor is biased "off" by said input being below said threshold level said first transistor is biased "on"; an inductor connected in series with each transistor; a pair of pulse shaping circuits each having an input; each pulse shaping circuit including a transistor and a tuned load; a discharge path respectively connecting each inductor to the input of each pulse shaping circuit for "on" biasing said transistor during the application thereto of discharge energy from said inductor for initiating oscillations in said tuned load; a series connected unidirectional element in said tuned load for preventing current in one direction therein; said inductors being of such value that said discharge energy is applied to said pulse shaping circuit during a first positive current swing in said tuned load and terminated prior to the initiation of a second positive current swing therein.

4. A circuit arrangement capable of discriminating between voltage input levels above and below a threshold voltage level for generating a first output pulse when said input level changes from below to above said threshold level and a second output pulse distinguishable from said first output pulse when said input level changes from above to below said threshold level comprising: a difference amplifier including a pair of transistors; means connecting a first of said transistors to said voltage input; means connecting a second of said transistors to a voltage source equal to said threshold level; means coupling said first and second transistors such that when said first transistor is biased "on" by said input being above said threshold level, said second transistor is biased "off" and when said second transistor is biased "off" by said input being below said threshold level, said first transistor is biased "on"; means connected to each of said transistors for storing energy during the period the transistor is conducting; and means for discharging said stored energy when said transistor stops conducting.

5. A circuit arrangement capable of discriminating between voltage input levels above and below a threshold voltage level for generating a first output pulse when said input level changes from below to above said threshold level and a second output pulse distinguishable from said first output pulse when said input level changes from above to below said threshold level comprising: a difference amplifier including a pair of transistors; means connecting a first of said transistors to said voltage input; means connecting a second of said transistors to a voltage source equal to said threshold level; means coupling said first and second transistors such that when said first transistor is biased "on" by said input being above said threshold level said second transistor is biased "off" and when said second transistor is biased "off" by said input being below said threshold level said first transistor is biased "on"; means connected to each of said transistors for storing energy during the period the transistor is conducting; a pair of pulse shaping circuits; each pulse shaping circuit including a transistor and a tuned load; means for respectively discharging said stored energy, when said amplifier transistors stop conducting, into said pulse shaping circuits for "on" biasing said pulse shaping circuit transistors during the application of said energy for initiating oscillations in said tuned load; a series connected unidirectional element in said tuned load for preventing current in one direction therein; said storage means being of a specific value such that the application of the energy discharge continues at least until the termination of a first positive current swing in the tuned load but terminates prior to the initiation of a second positive current swing therein.

6. A pulse shaping circuit comprising a transistor and a tuned load coupled thereto; means for "on" biasing said transistor to thereby initiate oscillations in said load; a unidirectional element connected in series in said tuned load for clipping negative current swings therein; and means for "off" biasing said transistor during the period subsequent to the termination of a first positive current swing in said load and prior to the initiation of a second positive current swing in said load.

7. The circuit of claim 6 wherein said means for "on" and "off" biasing said transistor includes an energy storage device and a discharge path connecting said device to said transistor; said device and said discharge path defining a discharge time constant so as to begin to "off" bias said transistor subsequent to the termination of a first positive current swing in said load and prior to the initiation of a second positive current swing in said load.

8. In combination with a source of bilevel output voltages, means responsive to changes in said level for providing a pulse on a first output terminal indicative of a change from a first to a second level and on a second output terminal indicative of a change from a second to a first level; said means comprising: a difference amplifier including a pair of transistors; means connecting a first of said transistors to said bilevel voltage source; means connecting a second of said transistors to a voltage source having a value between said two levels; means coupling said first and second transistors such that when said bilevel source is at a first level, said first transistor is biased "on" and said second transistor is biased "off" and when said bilevel source is at a second level, said first transistor is biased "off" and said second transistor is biased "on"; means connected to each of said transistors for storing energy during the period the transistor is conducting; and means for discharging said stored energy when said transistor stops conducting.

9. A pulse shaping circuit comprising: a transistor and a tuned load, including a capacitor, coupled thereto; means for charging said capacitor; means for "on" biasing said transistor to discharge said capacitor through said transistor and said tuned load to thereby initiate oscillations in said load; a unidirectional element connected in series in said tuned load for clipping negative current swings therein; and means for "off" biasing said transistor during the period subsequent to the termination of a first positive current swing in said load and prior to the initiation of a second positive current swing in said load.

References Cited by the Examiner

UNITED STATES PATENTS

| | | | |
|---|---|---|---|
| 2,677,122 | 4/54 | Gardner | 328—153 |
| 2,946,899 | 7/60 | Day | 307—88.5 |
| 3,075,155 | 1/63 | Reaves | 330—69 |

ARTHUR GAUSS, *Primary Examiner.*

JOHN W. HUCKERT, *Examiner.*